United States Patent
Yoo et al.

(10) Patent No.: US 9,898,108 B2
(45) Date of Patent: Feb. 20, 2018

(54) IMAGE ERASING DEVICE FOR ELECTRONIC CHALKBOARD SYSTEM, CONTROL METHOD THEREOF, DISPLAY APPARATUS, CONTROL METHOD THEREOF, AND ELECTRONIC CHALKBOARD SYSTEM

(71) Applicant: SAMSUNG ELECTRONICS CO., LTD., Suwon-si (KR)

(72) Inventors: Ho-june Yoo, Seoul (KR); Jong-bo Moon, Suwon-si (KR); Byung-seok Soh, Yongin-si (KR); Jong-keun Lee, Seoul (KR); Sang-on Choi, Suwon-si (KR); Hyun-mook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 14/173,411

(22) Filed: Feb. 5, 2014

(65) Prior Publication Data

US 2015/0002412 A1 Jan. 1, 2015

(30) Foreign Application Priority Data

Jun. 28, 2013 (KR) .................. 10-2013-0075970

(51) Int. Cl.
*G06F 3/038* (2013.01)
*G06F 3/046* (2006.01)
*G06F 3/0354* (2013.01)

(52) U.S. Cl.
CPC ........ *G06F 3/0383* (2013.01); *G06F 3/03545* (2013.01); *G06F 3/046* (2013.01)

(58) Field of Classification Search
CPC ..... G06F 3/03545; G06F 3/0383; G06F 3/046
(Continued)

(56) References Cited

U.S. PATENT DOCUMENTS 4,670,751 A * 6/1987 Enokido et al. ............ 178/19.01
5,023,408 A * 6/1991 Murakami ............... G06F 3/033
178/18.07
(Continued)

FOREIGN PATENT DOCUMENTS

EP 0114093 A2 7/1984
EP 0347725 A2 12/1989
(Continued)

OTHER PUBLICATIONS

Communication dated Nov. 3, 2014, issued by the European Patent Office in counterpart European Application No. 14154035.1.
(Continued)

*Primary Examiner* — Nelson Rosario
(74) *Attorney, Agent, or Firm* — Sughrue Mion, PLLC

(57) ABSTRACT

An erasing device to erase an image displayed on a display apparatus, the erasing device including: a housing; a generator to generate an electromagnetic field so that the electromagnetic field is emitted from each of a plurality of portions of a tip of the housing; and a controller to control the generator to generate the electromagnetic field when the tip touches a surface of the display apparatus so that the display apparatus detecting the electromagnetic field erases an image within a preset image deletion region with a predetermined area based on a position on the surface touched by the tip, wherein the generator adjusts output of the electromagnetic field from each portion of the tip based on whether each portion of the tip touches the surface so that the display apparatus adjusts the area of the image deletion region based on the portion of the tip touched by the surface.

12 Claims, 19 Drawing Sheets

(58) Field of Classification Search
USPC .............. 345/156, 173, 176, 179; 356/400;
359/844; 455/566; 178/19.02; 206/214;
850/1; 401/195; 725/109; 382/186
See application file for complete search history.

(56) References Cited

U.S. PATENT DOCUMENTS

| | | | |
|---|---|---|---|
| D639,856 S * | 6/2011 | Ahman | D19/188 |
| 2004/0047505 A1 * | 3/2004 | Ghassabian | G06K 9/00 |
| | | | 382/186 |
| 2009/0309839 A1 | 12/2009 | Hildebrandt et al. | |
| 2010/0182284 A1 * | 7/2010 | Tremblay | G06F 3/038 |
| | | | 345/179 |
| 2011/0080378 A1 * | 4/2011 | Hsu | G06F 1/32 |
| | | | 345/179 |
| 2011/0083912 A1 * | 4/2011 | Liu et al. | 178/19.01 |
| 2012/0293425 A1 * | 11/2012 | Lee et al. | 345/173 |
| 2013/0088465 A1 * | 4/2013 | Geller | G06F 3/03545 |
| | | | 345/179 |
| 2014/0176512 A1 * | 6/2014 | Srinivas et al. | 345/179 |
| 2014/0300558 A1 * | 10/2014 | Yamaguchi | G06F 3/0416 |
| | | | 345/173 |

FOREIGN PATENT DOCUMENTS

| | | |
|---|---|---|
| KR | 10-2012-0127782 A | 11/2012 |
| WO | 9839729 A2 | 9/1998 |

OTHER PUBLICATIONS

Office Action dated Nov. 18, 2014, issued by the European Patent Office in counterpart European Application No. 14154035.1.
Communication dated Mar. 15, 2016, issued by the European Patent Office in counterpart European Application No. 14154035.1.

* cited by examiner

IMAGE ERASING DEVICE FOR ELECTRONIC CHALKBOARD SYSTEM, CONTROL METHOD THEREOF, DISPLAY APPARATUS, CONTROL METHOD THEREOF, AND ELECTRONIC CHALKBOARD SYSTEM

CROSS-REFERENCE TO RELATED APPLICATION

This application claims priority from Korean Patent Application No. 10-2013-0075970, filed on Jun. 28, 2013 in the Korean Intellectual Property Office, the disclosure of which is incorporated by reference in its entirety.

BACKGROUND

Field

Apparatuses consistent with the exemplary embodiments relate to an image erasing device for an electronic chalkboard system to erase an image drawn on a display panel with a pen device in an electronic chalkboard system, a control method thereof, a display apparatus, a control method thereof and an electronic chalkboard system, more particularly to an image erasing device for an electronic chalkboard system configured to easily adjust an area of a region for erasing an image displayed on a display panel when the image erasing device is used, a control method thereof, a display apparatus, a control method thereof and an electronic chalkboard system.

Description of the Related Art

A display apparatus is a device that processes image signals/image data input from external sources or stored therein according to various processes to display images on a display panel or screen. The display apparatus is configured as various types, such as a TV, a monitor, a portable media player, or the like. With development in technology, diverse functions are added and reinforced for the display apparatus. For instance, the display apparatus may be configured as an electronic chalkboard system including a pen device which enables a touch on a display panel.

The electronic chalkboard system detects coordinates of a position on the panel or screen touched with the pen device and displays a picture corresponding to the detected coordinates on the panel or screen. Various types of electronic chalkboard systems are realized, for example, in which a pressure-sensitive screen is used for the display panel to detect pressure by the pen device on the panel, in which coordinates of light formed as an image on the screen by light beams projected from the pen device is detected by a charge coupled device (CCD) camera, and in which ultra-violet signals discharged on a plasma display panel (PDP) and a pen device using the signal are used.

However, erasing the image drawn on the panel may be needed in the electronic chalkboard system. Here, erasing all drawn images by resetting the panel is not appropriate for efficiency in utilization. Thus, a structure for erasing only a selective region of the entire image is provided depending on a configuration of the electronic chalkboard system, thereby enabling a user to conveniently utilize the electronic chalkboard system.

SUMMARY

According to an aspect of an exemplary embodiment, there is provided an erasing device configured to erase an image displayed on a display apparatus, the erasing device including: a housing; a generator configured to generate an electromagnetic field so that the electromagnetic field is emitted from each of a plurality of portions of a tip of the housing; and a controller configured to control the generator to generate the electromagnetic field when the tip touches a surface of the display apparatus so that the display apparatus detecting the electromagnetic field erases an image within a preset image deletion region with a predetermined area based on a position on the surface touched by the tip, wherein the generator adjusts output of the electromagnetic field from each portion of the tip based on whether each portion of the tip touches the surface so that the display apparatus adjusts the area of the image deletion region based on the portion of the tip touched by the surface.

The generator may include a first resonance coil disposed corresponding to a first portion of the tip among the plurality of portions and a second resonance coil disposed corresponding to a second portion of the tip different from the first portion among the plurality of portions.

The first resonance coil and the second resonance coil may be disposed at the same height when the erasing device is perpendicular to the surface.

The controller may drive the first resonance coil and the second resonance coil on the same resonance frequency to generate the electromagnetic field.

The controller may drive the first resonance coil and the second resonance coil on different resonance frequencies to generate the electromagnetic field.

The erasing device may further include a sensor to detect that the first portion and the second portion touch the surface, wherein the controller may drive the first resonance coil when the sensor detects that the first portion is touched, and may drive the first resonance coil and the second resonance coil when the sensor detects that the first portion and the second portion are touched.

The erasing device may further include a sensor to detect that the tip is touched, wherein the controller may drive the first resonance coil when the sensor detects that the first portion is touched, and may drive the first resonance coil and the second resonance coil when the sensor detects that the first portion and the second portion are touched or that only the second portion is touched.

The erasing device may further include a sensor to detect that the tip is touched, wherein the first resonance coil and the second resonance coil may be disposed at an angle to a longitudinal axis of the erasing device such that a gap between the first resonance coil and the second resonance coil becomes wide in a direction of the tip.

According to an aspect of another exemplary embodiment, there is provided a display apparatus including: a display; a digitizing module configured to detect whether an erasing device touches a position on the display; and a controller configured to determine the position on the display touched by the erasing device based on a result of detection by the digitizing module and to control to erase an image in an image deletion region with a predetermined area set based on the determined position, the image being displayed on the display, wherein the controller adjusts at least one of the area and a shape of the image deletion region corresponding to a portion of a tip touching the display among a plurality of portions of the tip of the erasing device to possibly touch the display.

When the plurality of portions of the tip of the erasing device includes a first portion and a second portion, the area of the image deletion region when it is detected that both the first portion and the second portion touch the display may be set to be relatively greater than the area of the image deletion region when it is detected that the first portion touches the display.

The digitizing module may detect an electromagnetic field emitted from each of the portions of the tip of the erasing device to detect that the portion touches the position on the display.

The digitizing module may be in a plate shape and is disposed behind the display to detect an electromagnetic field emitted from the erasing device touching the position on the display.

According to an aspect of another exemplary embodiment, there is provided a control method of an erasing device configured to erase an image displayed on a display apparatus, the control method including: detecting that a tip of the erasing device including a plurality of portions each emitting an electromagnetic field touches a surface of the display apparatus; and emitting the electromagnetic field when the tip touches the surface so that the display apparatus determines a position on the surface touched by the tip based on the electromagnetic field and erases an image within a preset image deletion region with a predetermined area based on the touched position, wherein the emitting of the electromagnetic field includes adjusting emission of the electromagnetic field from each portion of the tip based on whether each portion of the tip touches the surface so that the display apparatus adjusts the area of the image deletion region based on the portion of the tip touched by the surface.

According to an aspect of another exemplary embodiment, there is provided a control method of a display apparatus, the control method including: detecting whether an erasing device touches a position on the display; and determining the position on the display touched by the erasing device and controlling to erase an image in an image deletion region with a predetermined area based on the determined position, the image being displayed on the display, wherein the controlling to erase the image in the image deletion region includes adjusting at least one of the area and a shape of the image deletion region corresponding to a portion of a tip touching the display among a plurality of portions of the tip of the erasing device to possibly touch the display.

When the plurality of portions of the tip of the erasing device includes a first portion and a second portion, the area of the image deletion region when it is detected that both the first portion and the second portion touch the display may be set to be relatively greater than the area of the image deletion region when it is detected that the first portion touches the display.

The detecting of whether the erasing device touches the position on the display may include detecting an electromagnetic field emitted from each of the portions of the tip of the erasing device to detect that the portion touches the position on the display.

According to an aspect of another exemplary embodiment, there is provided an electronic chalkboard system including: a display apparatus including a display on which an image is displayed; and an erasing device including a tip to touch a position on the display, wherein the display apparatus erases an image in an image deletion region with a predetermined area set based on the position on the display touched by the erasing device and adjusts at least one of the area and a shape of the image deletion region according to a portion of the tip touching the display or an area of a portion of the tip touching the display.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
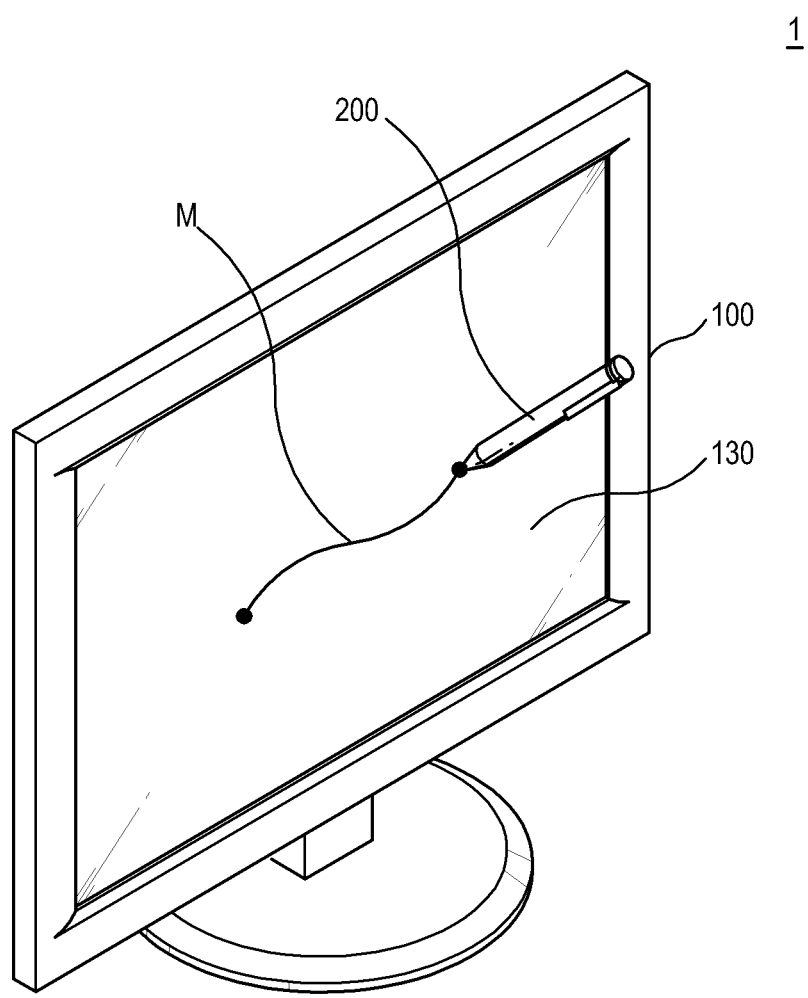
FIG. 1 illustrates an electronic chalkboard system according to a first exemplary embodiment.

Below, exemplary embodiments will be described in detail with reference to the accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 illustrates an electronic chalkboard system 1 according to a first exemplary embodiment.

As shown in FIG. 1, the electronic chalkboard system according to the present embodiment includes a display apparatus 100 to display an image and a pen device 200 held by a user to touch a particular position on a display 130 of the display apparatus 100.

The display apparatus 100 may be provided as a TV, a computer monitor, a video wall, or the like that includes at least one display 130 and configured to perform an electronic chalkboard operation by implementation of embedded applications. For example, when the display apparatus 100 is provided as a TV, the display apparatus 100 may be configured to perform the electronic chalkboard operation in a preset mode or with a preset application activated.

In the present embodiment, the display apparatus 100 includes one display 130. However, the display apparatus 100 may have a large-scale screen, realized by arranging a plurality of displays 130 in a matrix form, depending on a configuration thereof.

The pen device 200 has a pen shape extending in one direction, which the user may hold with one hand. A tip of the pen device 200 has a structure of generating an electromagnetic field, and comes in touch with a surface of the display 130 when the user carries the pen device 200.

Accordingly, when the user draws a picture by touching the display 130 with the pen device 200, the display apparatus 100 continuously detects the electromagnetic field generated from the tip of the pen device 200, thereby consecutively outputting coordinates of a position on the display 130 touched by the pen device 200. The display apparatus 100 displays a picture M corresponding to the output coordinates on the display 30. Consequently, the display apparatus 100 displays the picture M that the user drew on the display 130 with the pen device 200 in a corresponding position on the display 130.

However, while the user is using the electronic chalkboard system 1, the user may want to erase only part of the picture displayed on the display apparatus 100. For example, the user may want to correct a miswritten word while doing a long piece of writing on the display 130.

Figure 2:
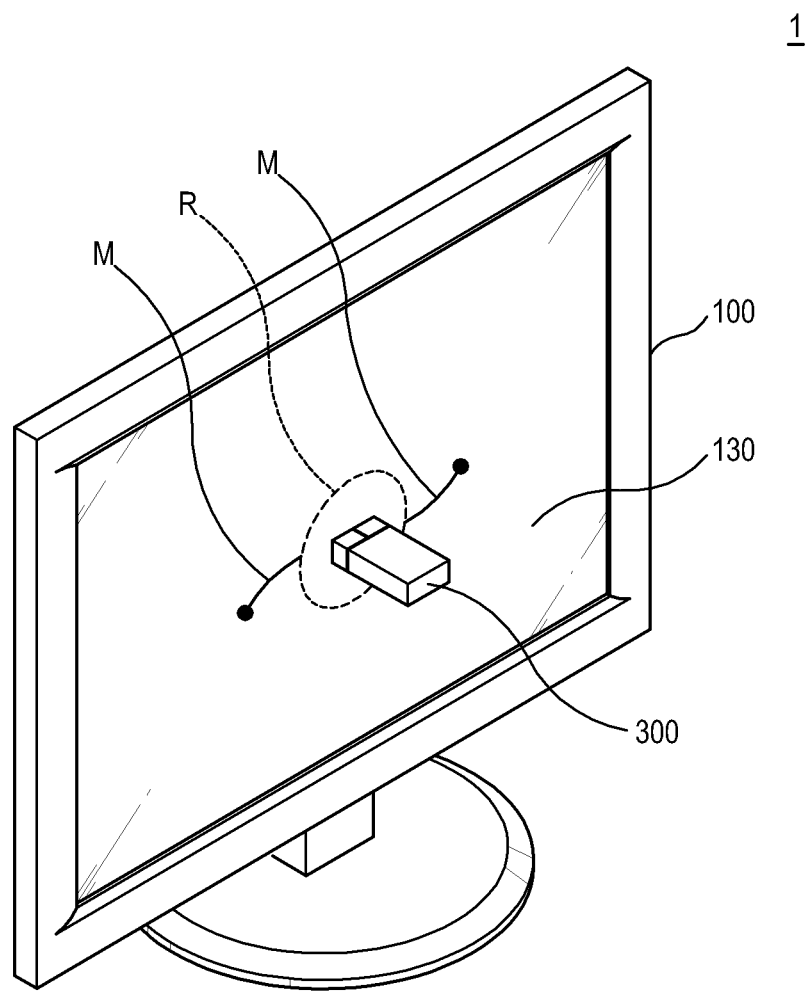
FIG. 2 illustrates that an erasing device is applied to the electronic chalkboard system of FIG. 1.

FIG. 2 illustrates that an erasing device 300 is applied to the electronic chalkboard system 1.

As shown in FIG. 2, the electronic chalkboard system includes the erasing device 300 configured to erase a portion R of the picture M displayed on the display apparatus 100.

The erasing device 300 has a prism form having various shapes of cross sections, for example, a triangle, a rectangle and a circle. The erasing device 300 has a structure of coming in touch with the surface of the display 130 by being held by the user, similarly to the pen device 200. A tip of the erasing device 300 coming in touch with the surface of the display 130 has a structure of generating an electromagnetic field, similar to the tip of the pen device 200.

Accordingly, when the electromagnetic field from the tip of the erasing device 300 is detected on the display 130, the display apparatus 100 outputs coordinates of a position at which the electromagnetic field is detected on the display 130. The display apparatus 100 erases the picture M displayed in a region R with a preset area based on the output coordinates.

When the user continues to move the erasing device 300 along the surface of the display 130, holding the erasing device 300, the display apparatus 100 continuously detects the electromagnetic field generated from the tip of the erasing device 300 to output coordinates of positions on the display 130 touched by the erasing device 300. Then, the display apparatus 100 erases a picture M in the region R derived based on the coordinates to provide such an effect as the user erases a picture or letters written on a notebook with an eraser.

Here, a resonance frequency of the electromagnetic field generated from the pen device 200 is different from a resonance frequency of the electromagnetic field generated from the erasing device 300. The display apparatus 100 derives a resonance frequency of a detected electromagnetic field to determine whether the electromagnetic field is generated from the pen device 200 or the erasing device 300.

The display apparatus 100 determines whether to draw a picture M on the display 130 or to erase the displayed picture M based on a determination result.

Hereinafter, a configuration of the display apparatus 100 will be described in detail with reference to FIG. 3.

Figure 3:
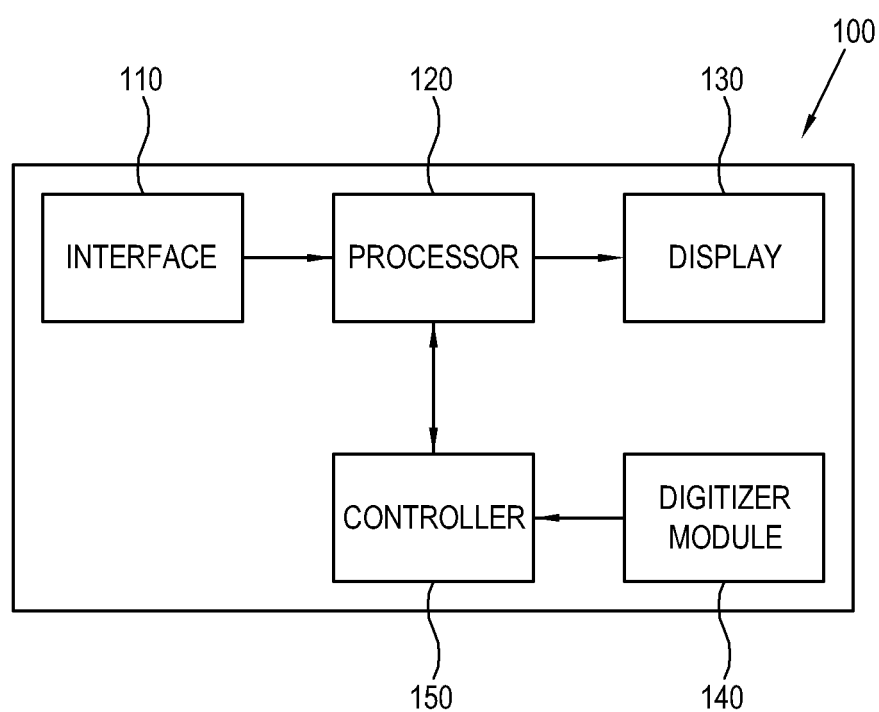
FIG. 3 is a block diagram illustrating a configuration of a display apparatus of FIG. 1.

FIG. 3 is a block diagram illustrating the configuration of the display apparatus 100.

As shown in FIG. 3, the display apparatus 100 includes an interface 110 to transmit/receive various signals/information/data to/from an outside of the display apparatus 100, a processor 120 to process the data received through the interface 110, a display 130 to display an image based on the data processed by the processor 120, a digitizer module 140 to detect an electromagnetic field by the pen device 200 or the erasing device 300, and a controller 150 to control operations of all components of the display apparatus 100.

The interface 110 is connected to various types of external devices/peripheral devices locally or via network to communicate therewith. The interface 110 may be provided as a communication port for each device or an assembly of communication modules. The interface 110 is embedded in the display apparatus 100, but the entire interface 110 or part of the interface 110 may be additionally installed in the display apparatus 100 as an add-on or dongle form.

The interface 110 transmits and receives signals in accordance with a protocol designed for each connected device and thus may transmit and receive a signal based on an individual communication protocol for each connected device. For example, the interface 110 may transmit and receive a radio frequency (RF) signal and various image signals in accordance with composite video, component video, super video, SCART, high definition multimedia interface (HDMI), DisplayPort, unified display interface (UDI) or wireless HD standards.

The processor 120, i.e. an image processor, performs various image processing processes on transmitted signals or data. The processor 120 outputs processed data to the display 130 to display an image based on the data.

The processor 120 may perform any kind of image processing, without being limited to, for example, decoding, de-interlacing, frame refresh rate conversion, noise reduction to improve image quality, detail enhancement, or the like. The processor 120 may be configured as an image processing board (not shown) including separate components which independently conduct individual processes or an integrated multi-functional component, such as a system on chip (SOC).

The processor 120 displays a new image on particular coordinates on the surface of the display 130 or erases a displayed image according to an instruction from the controller 150. That is, the processor 120 receives coordinate information and information indicating whether the coordinate information is due to the pen device 200 or the erasing device 300 from the controller 150 and controls display of an image on the display 130 based on the received information.

The display 130 displays an image based on data output from the processor 120 on the surface of the display 130. The display 130 may be configured in various display modes using liquid crystals, plasma, light emitting diodes, organic light emitting diodes, a surface conduction electron emitter, a carbon nano-tube, nano-crystals, or the like. In the present embodiment, the display 130 is provided as a liquid crystal display (LCD) panel.

The display 130 may further include an additional component depending on a display mode thereof. For example, when the LCD panel is applied as in the present embodiment, the display 130 includes a backlight unit (not shown) to provide light to the LCD panel (not shown) and a panel driving board (not shown) to drive the panel.

The digitizer module 140 detects an electromagnetic field generated from the pen device 200 or the erasing device 300 and transmits detected information to the controller 150. The digitizer module 140 has a plate shape parallel with the surface of the display 130.

Since the digitizer module 140 is provided to detect the electromagnetic fields generated from the tip of the pen device 200 and the erasing device 300, the digitizer module 140 may be disposed in any location as long as the digitizer module 140 detects the electromagnetic fields. For example, when the display 130 is an LCD panel, the digitizer module 140 is disposed behind the backlight unit to provide light to the LCD panel, parallel with the LCD panel. That is, a structure in which the backlight unit is disposed between the digitizer module 140 and the LCD panel is applied, thereby preventing interference by the digitizer module 140 when providing light from the backlight unit to the LCD panel.

The controller 150 outputs coordinates of a position on the display 130 or the digitizer module 140 at which an electromagnetic field is detected according to a state of detecting the electromagnetic field transmitted from the digitizer module 140 and determines whether the electromagnetic field is due to the pen device 200 or the erasing device 300. The controller 150 continues to transmit the derived coordinate information and determination information to the processor 120, so that a picture drawn by the user with the pen device 200 is displayed on the display 130 or part of the picture erased by the user with the erasing device 300 is not displayed on the display 130.

Hereinafter, a method in which the controller 150 detects a position touched by the pen device 200 or the erasing device 300 will be described with reference to FIG. 4.

Figure 4:
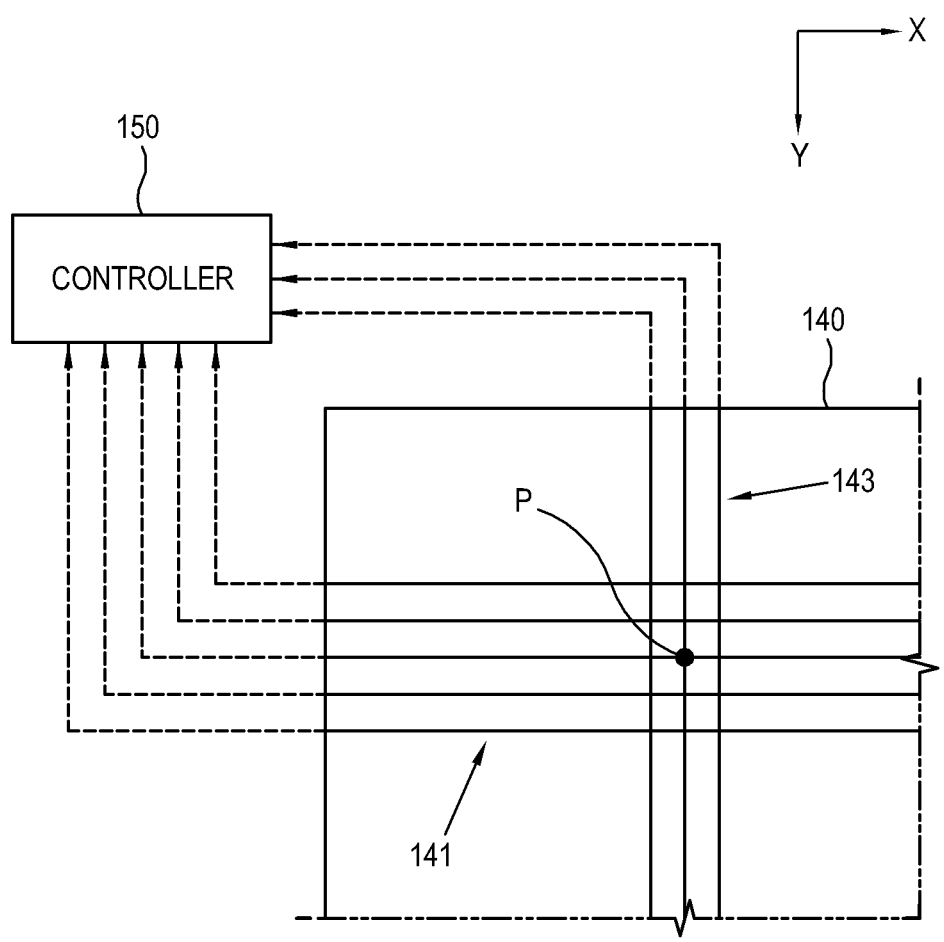
FIG. 4 illustrates a structure for the display apparatus of FIG. 1 detecting a position touched by a pen device or erasing device.

FIG. 4 illustrates a structure for detecting the position touched by the pen device 200 or the erasing device 300.

As shown in FIG. 4, the digitizer module 140 is disposed adjacently to face the display 130. Thus, when the pen device 200 touches the display 130, the digitizer module 140 may detect the electromagnetic field generated from the tip of the pen device 200.

The digitizer module 140 includes horizontal wires 141 parallel with an x direction and vertical wires 143 parallel with a y direction. The horizontal wires 141 and the vertical wires 143 cross each other to form a network on an entire surface of the digitizer module 140. Although FIG. 4 shows part of the horizontal wires 141 and the vertical wires 143, the horizontal wires 141 and the vertical wires 143 are actually formed on the entire surface of the digitizer module 140. The horizontal wires 141 and the vertical wires 143 are electrically connected to the controller 150.

Power is not applied to the horizontal wires 141 and the vertical wires 143. In this state, when the user touches a position on the display 130 with the pen device 200, the electromagnetic field of the pen device 200 is exerted in a corresponding position P of the digitizer module 140 disposed behind the display 130. Then, an electric current due to the electromagnetic field flows in a horizontal wire 141 and a vertical wire 143 corresponding to the position P among all horizontal wires 141 and all vertical wires 143.

The electric current flowing in the horizontal wire 141 and the vertical wire 143 is input to the controller 150, and the controller 150 specifies the horizontal wire 141 and the vertical wire 143 in which the electric current flows among the horizontal wires 141 and the vertical wires 143. Accordingly, the controller 150 may derive coordinates of the position P touched by the pen device 200 on the display 130.

In the present embodiment, the detected position P is a point, which one horizontal wire 141 and one vertical wire 143 pass through. However, such an example is provided to concisely and clearly describe the present embodiment. Alternatively, depending on a structure, the detected position P may be a region with a predetermined area, which a plurality of horizontal wires 141 and a plurality of vertical wires 143 pass through.

A similar principle to that of the pen device 200 may be applied to the erasing device 300. When the controller 150 determines that the position P at which the electromagnetic field is detected is due to the erasing device 300, the controller 150 controls the processor 120 to erase an image within a region with a preset area based on the position P.

In detail, the controller 150 transmits information on x and y coordinates of the position P and information on a size and a shape of a region to be erased. The processor 120 specifies the region to be erased in a displayed image based on the information transmitted from the controller 150.

Hereinafter, a configuration of the erasing device 300 will be described in detail.

Figure 5:
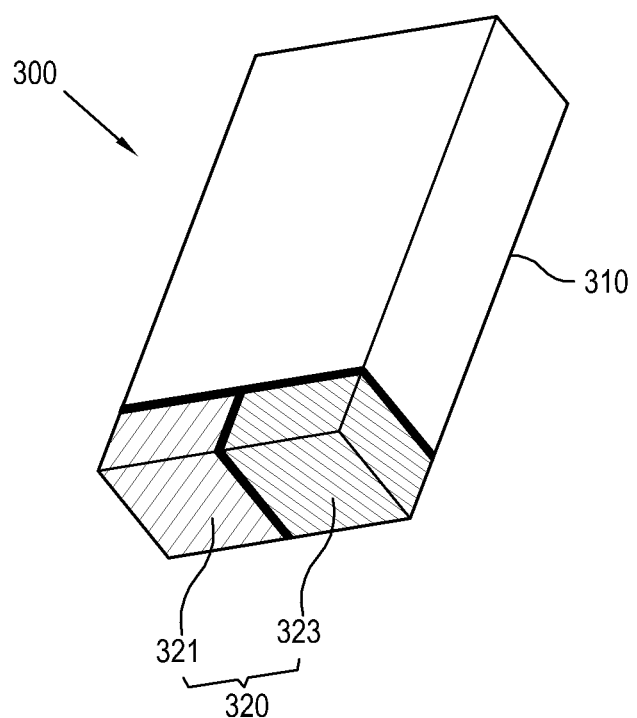
FIG. 5 is a perspective view of the erasing device of FIG. 2.

FIG. 5 is a perspective view of the erasing device 300.

As shown in FIG. 5, the erasing device includes a housing 310 having a rectangular column shape and a tip 320 formed in an end portion of the housing 310.

The housing 310 may have various shapes, without being limited to the rectangular shape. The housing 310 may include various materials, for example, plastic and metal, and accommodates all components of the erasing device 300, which will be described.

The tip 320 is formed in the end portion of the housing 310 on an outside of the erasing device 300 and refers to an end portion of the erasing device 300 in a lengthwise direction. The tip 320 may include a bottom surface of the erasing device 300, edges forming the bottom surface and portions with a predetermined thickness adjacent to the edges. The tip 320 is a part which comes in touch with the display 130 with the erasing device 300 held by the user.

In the present embodiment, the tip 320 is divided into a first tip 321, i.e. a first tip portion, and a second tip 323, i.e. a second tip portion. The first tip 321 and the second tip 323 correspond to resonance coils (not shown) of the erasing device 300.

The first tip 321 and the second tip 323 are disposed to be at the same height, that is, parallel with each other, when the erasing device 300 stands perpendicular to the surface of the display 130. That is, when the user places the erasing device 300 to perpendicularly touch the surface of the display 130, the first tip 321 and the second tip 323 simultaneously come in touch with the surface of the display 130.

Such a structure enables either of the first tip 321 and the second tip 323 to come in contact with the surface of the display 130 when the user places the erasing device 300 to touch the surface of the display 130 at a preset angle, not perpendicularly to the surface of the display 130.

Figure 6:
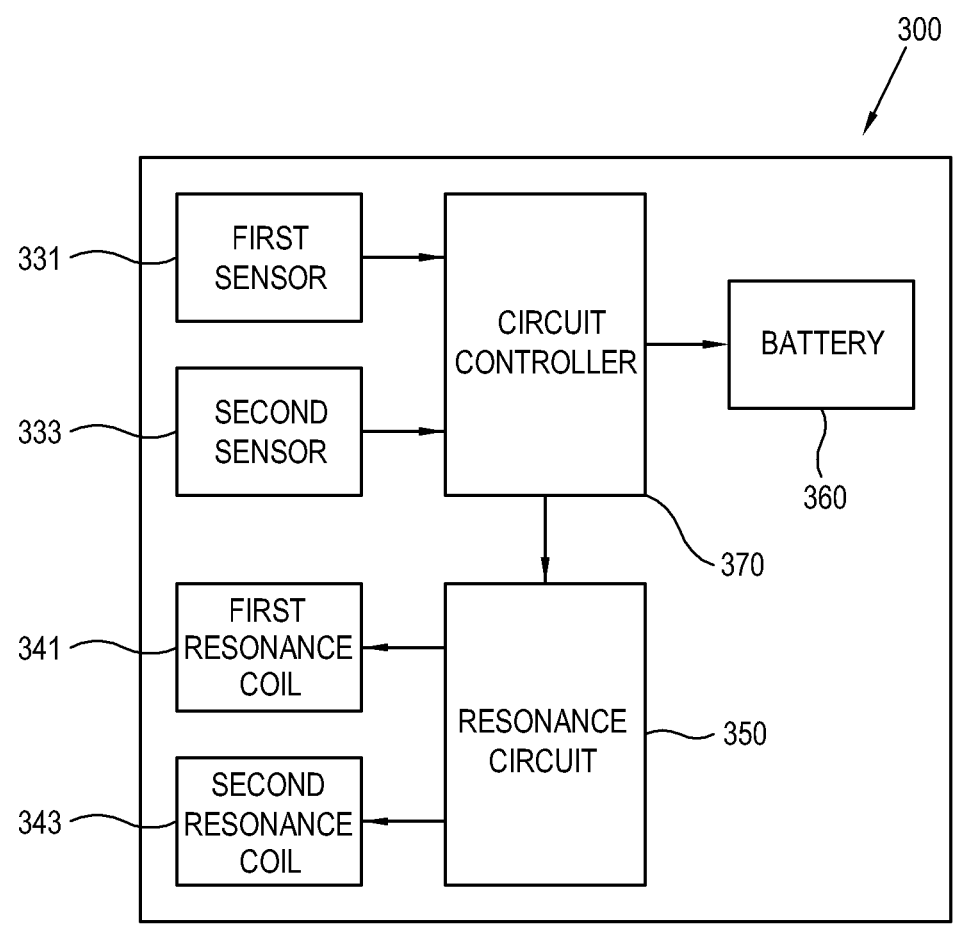
FIG. 6 is a block diagram illustrating a configuration of the erasing device of FIG. 2.

FIG. 6 is a block diagram illustrating a configuration of the erasing device 300.

As shown in FIG. 6, the erasing device 300 includes sensors 331 and 333 to detect whether the tip 320 is touched, resonance coils 341 and 343 to generate an electromagnetic field when power is applied thereto, a resonance circuit 350 to drive the resonance coils 341 and 343 such that an electromagnetic field with a preset resonance frequency is generated as power is applied to the resonance coils 341 and 343, a battery 360 to supply power, and a circuit controller 370 to control operations of all components of the erasing device 300.

The sensors 331 and 333 are provided to detect whether the tip 320 is touched and may be designed variously. For example, the sensors 331 and 333 may be configured as a pressure sensor installed in the tip 320. Alternatively, the sensors 331 and 333 may be a physical switch installed in the tip 320, which may be turned on as the tip 320 is touched. The sensors 331 and 333 may generate a detection signal when a preset level or higher of pressure is applied to the tip 320 depending on a structure of the sensors 331 and 333.

The sensors 331 and 333 includes a first sensor 331 corresponding to the first tip 321 and a second sensor 333 corresponding to the second tip 323. That is, the first sensor 331 detects whether the first tip 321 is touched, while the second sensor 333 detects whether the second tip 323 is touched.

The resonance coils 341 and 343 includes a first resonance coil 341 corresponding to the first tip 321 and a second resonance coil 343 corresponding to the second tip 323. The first resonance coil 341 and the second resonance coil 343 are accommodated in the housing 300, adjacent to the first tip 321 and the second tip 323, respectively.

The first resonance coil 341 and the second resonance coil 343 may be installed in any form. For example, the second resonance coil 343 may be installed such that the digitizer module 140 detects an electromagnetic field generated from the second resonance coil 343 when the second tip 323 touches the display 130. The first resonance coil 341 is disposed in the same manner.

Here, when the first tip 321 is touched and the second tip 323 is not touched, the digitizer module 140 detects an electromagnetic field generated by the first resonance coil.

The first resonance coil 341 and the second resonance coil 343 are installed considering the foregoing aspects and accordingly are disposed at the same height, parallel with each other, similar to the first tip 321 and the second tip 323. That is, the first resonance coil 341 and the second resonance coil 343 are placed at the same height when the erasing device 300 stands perpendicular to the surface of the display 130.

The resonance circuit 350 drives the resonance coils 341 and 343 using power from the battery 360 so that the resonance coils 341 and 343 generate an electromagnetic field with a preset resonance frequency. The resonance circuit 350 is realized as various circuit configurations including an oscillator to maintain electromagnetic fields of the resonance coils 341 and 343. The resonance circuit 350 enables either of the first resonance coil 341 and the second resonance coil 343 to generate an electromagnetic field or enables both the first resonance coil 341 and the second resonance coil 343 to generate an electromagnetic field according to control of the circuit controller 370.

In the present embodiment, the resonance circuit 350 drives the first resonance coil 341 and the second resonance coil 343 on the same resonance frequency. That is, the electromagnetic field generated from the first resonance coil 341 and the electromagnetic field generated from the second resonance coil 343 have the same resonance frequency.

The circuit controller 370 controls the resonance circuit 350 such that the resonance coils 341 and 343 generate an electromagnetic field according to a detection signal reporting that the tip 320 is touched when the detection signal is received from the sensors 331 and 333.

Figure 7:
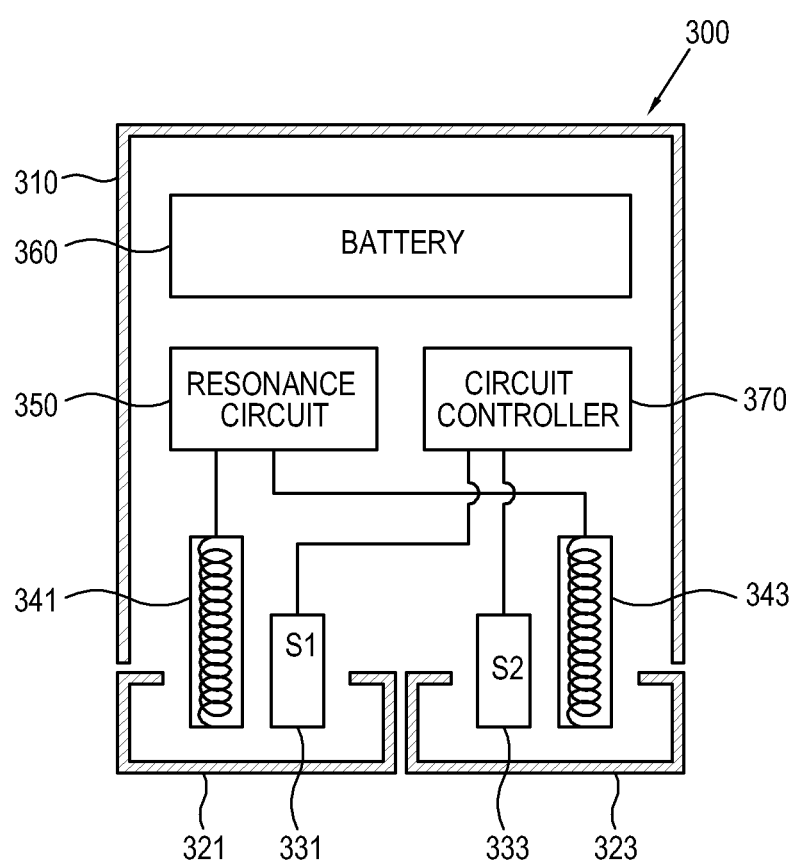
FIG. 7 illustrates an internal installation structure of the erasing device of FIG. 2.

FIG. 7 illustrates an internal installation structure of the erasing device 300.

As shown in FIG. 7, with the first tip 321 and the second tip 323 looking downwards, the first sensor 331 and the second sensor 333 are disposed adjacent to the first tip 321 and the second tip 323 so as to detect whether the first tip 321 and the second tip 323 are touched.

The first resonance coil 341 and the second resonance coil 343 are disposed at the same height, adjacent to the first tip 321 and the second tip 323 so that an electromagnetic field is output through each of the first tip 321 and the second tip 323 as the first tip 321 and the second tip 323 are touched.

Considering the arrangement of the sensors 331 and 333 and the resonance coils 341 and 343, the resonance circuit 350, the battery 360 and the circuit controller 370 may be disposed in an upper part of the housing 310. However, such an arrangement is provided for illustrative purposes only and various changes and modifications may be made to the arrangement in design.

Hereinafter, ways in which the user uses the erasing device 300 will be described with reference to FIGS. 8 and 9.

Figure 8:
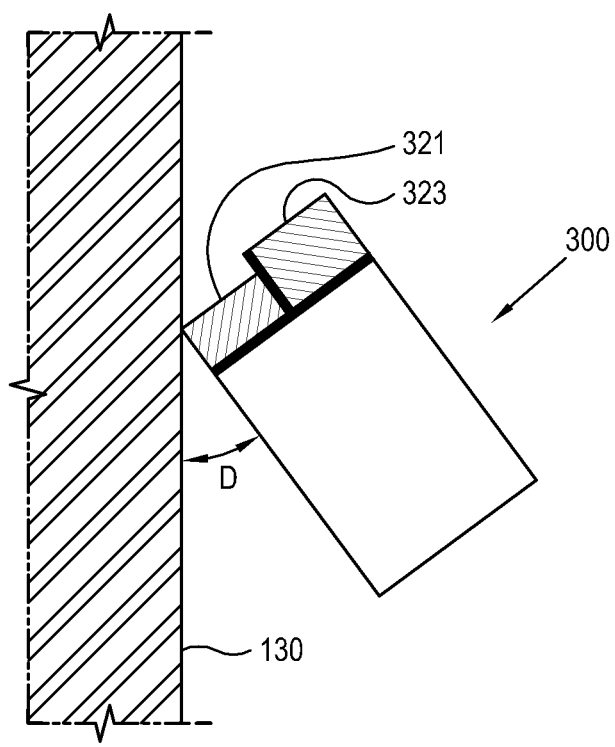
FIG. 8 illustrates that a user uses the erasing device of FIG. 2 at an angle.

FIG. 8 illustrates that the user uses the erasing device 300 at an angle.

As shown in FIG. 8, when the user holds the erasing device 300 to touch the surface of the display 130, the erasing device 300 may stand at an angle to the display 130, not perpendicular to the display 130. In this case, a longitudinal axis of the erasing device 300 and the surface of the display 130 form an angle D between 0 and 90, neither 0 degrees nor 90 degrees.

Here, the first tip 321 of the erasing device 300 touches the display 130, whereas the second tip 323 does not touch the display 130.

Figure 9:
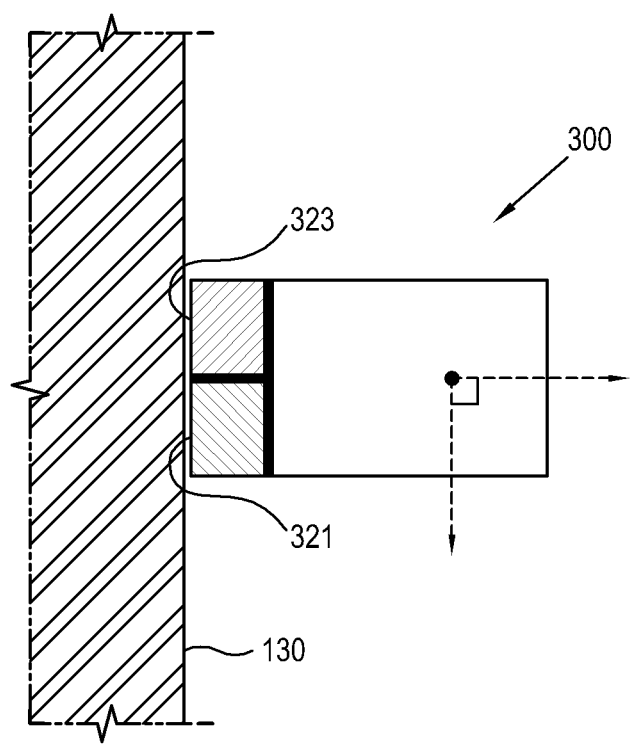
FIG. 9 illustrates that a user uses the erasing device of FIG. 2 standing upright.

FIG. 9 illustrates that the user uses the erasing device 300 standing upright.

As shown in FIG. 9, when the user holds the erasing device 300 to touch the surface of the display 130, the erasing device 300 may stand substantially perpendicular to the display 130. In this case, the longitudinal axis of the erasing device 300 and the surface of the display 130 form an angle that is substantially 90 degrees within a margin of error.

Here, both the first tip 321 and the second tip 323 of the erasing device 300 touch the display 130.

As shown in FIGS. 8 and 9, depending on a position of the erasing device 300 held by the user in use, only the first tip 321 touches the display 130 or both the first tip 321 and the second tip 323 of the erasing device 300 touch the display 130.

In the present embodiment, the following method is suggested based on the aforementioned structure of the erasing device 300 and the aforementioned ways in which the user uses the erasing device 300.

When the first tip 321 of the erasing device 300 touches the surface of the display 130, that is, a touched surface, the erasing device 300 forms an angle D with the touched surface of the display 130.

Then, the display apparatus 100 erases an image in an image deletion region with a preset area based on a touching position of the erasing device 300, adjusting at least one of the area and a shape of the image deletion region according to the angle D between the touched surface of the display 130 and the erasing device 300.

In detail, when the angle D is substantially 90 degrees, the display apparatus 100 relatively enlarges the area of the image deletion region. When the angle D is a predetermined angle which is not 90 degrees, the display apparatus 100 relatively reduces the area of the image deletion region.

Here, either the area of the image deletion region when the angle D is substantially 90 degrees or the area of the image deletion region when the angle D is the predetermined angle that is not 90 degrees may be set as a default value.

That is, if the area of the image deletion region when the angle D is substantially 90 degree is a default value, the same default value may be applied when the angle is substantially 90 degree, whereas a reduced value from the default value may be applied when the angle D is not 90 degrees. On the contrary, if the area of the image deletion region when the angle D is not 90 degrees is a default value, an increased value from the default value may be applied when the angle D is substantially 90 degree, whereas the same default value may be applied when the angle is not 90 degrees.

Further, the idea of the present invention may be also expressed as follows.

The erasing device 300 includes the tip 320 to come in touch with the touched surface of the display 130, and a portion or area of the tip 320 touching the touched surface of the display 130 varies depending on the position of the erasing device 300.

The display apparatus 100 erases the image in the image deletion region with the preset area based on the touching position of the erasing device 300, adjusting at least one of the area and a shape of the image deletion region according to the portion of the tip 320 coming in touch with the touched surface of the display or the area of the tip 320 touching the display 130.

In detail, with the erasing device 300 including the first tip 321 and the second tip 323, the display apparatus 100 relatively reduces the area of the image deletion region when the first tip 321 touches the display 130, and relatively enlarges the area of the image deletion region when both the first tip 321 and the second tip 323 touch the display 130.

Due to the foregoing configuration, the user may easily adjust the area of the image deletion region when using the erasing device 300.

Hereinafter, a shape of the image deletion region set by the display apparatus 100 when both the first tip 321 and the second tip 322 of the erasing device 300 touch the display 130 will be described with reference to FIGS. 10 to 13.

FIGS. 10 to 13 illustrate shapes of the image deletion region set by the display apparatus 100 when both the first tip 321 and the second tip 322 of the erasing device 300 touch the display 130.

Figure 10:
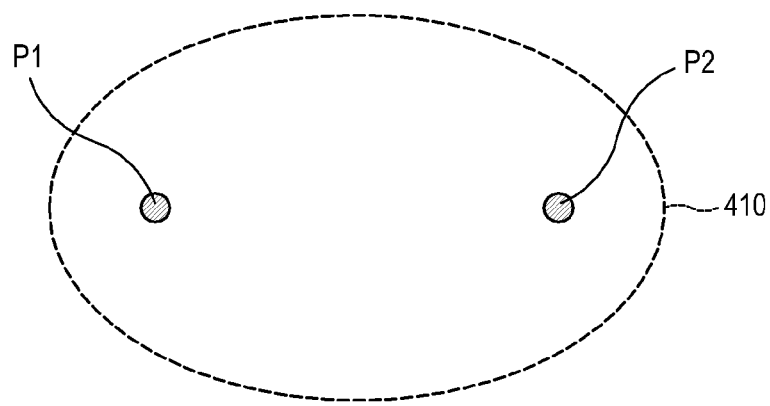
FIGS. 10 to 13 illustrate shapes of an image deletion region set by the display apparatus when both a first tip and a second tip of the erasing device of FIG. 2 touch a display.

As shown in FIG. 10, when a first position P1 by the first tip 321 and a second position P2 by the second tip 323 are determined, the display apparatus 100 sets an image deletion region 410 in an ellipse shape having the two positions P1 and P2 as two focal points and a preset area.

Figure 11:
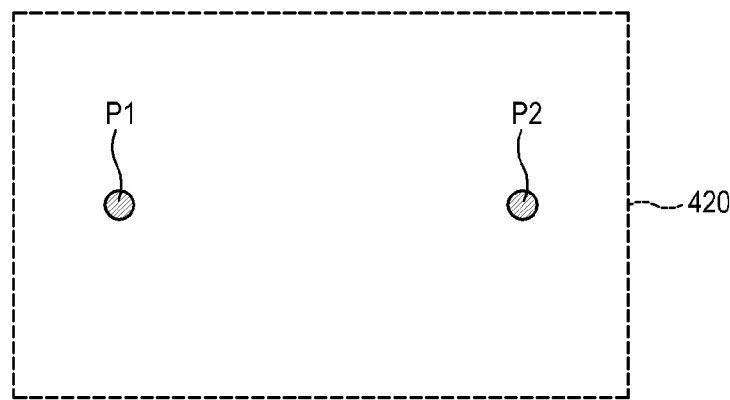

As shown in FIG. 11, the display apparatus 100 may set an image deletion region 420 in a rectangular or square shape with a preset area including the first position and the second position P1 and P2.

Figure 12:
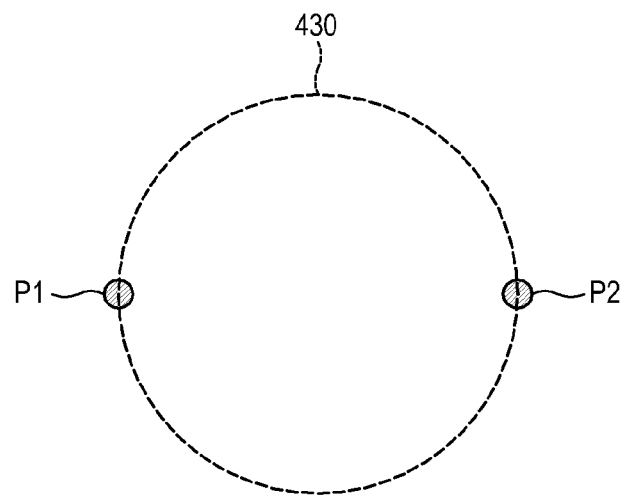

As shown in FIG. 12, the display apparatus 100 may set an image deletion region 430 in a circular shape which has a diameter being a distance between the first position P1 and the second position P2, the first position P1 and the second position P2 being disposed on the circumference of the circle shape.

Figure 13:
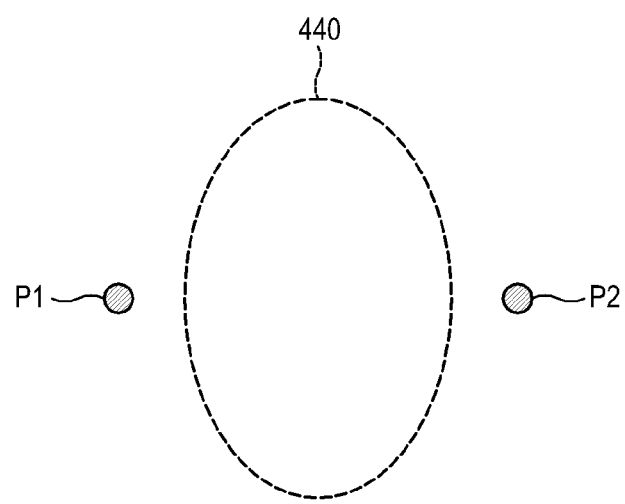

As shown in FIG. 13, the display apparatus 100 may set an image deletion region 440 in an ellipse shape or circular shape with a preset area which is disposed between the first position P1 and the second position P2.

As described above, various shapes of the image deletion region may be set by the display apparatus 100.

Meanwhile, to erase the image by placing both the first tip 321 and the second tip 323 to come in touch with the display 130 as in FIG. 9, an erasing operation by the user using the erasing device 300 is quickly performed. Here, either of the tips 321 and 323 may not touch the display 130 during the erasing operation by the user.

Accordingly, an erasing device 500 according to a second exemplary embodiment has a structure as follows.

Figure 14:
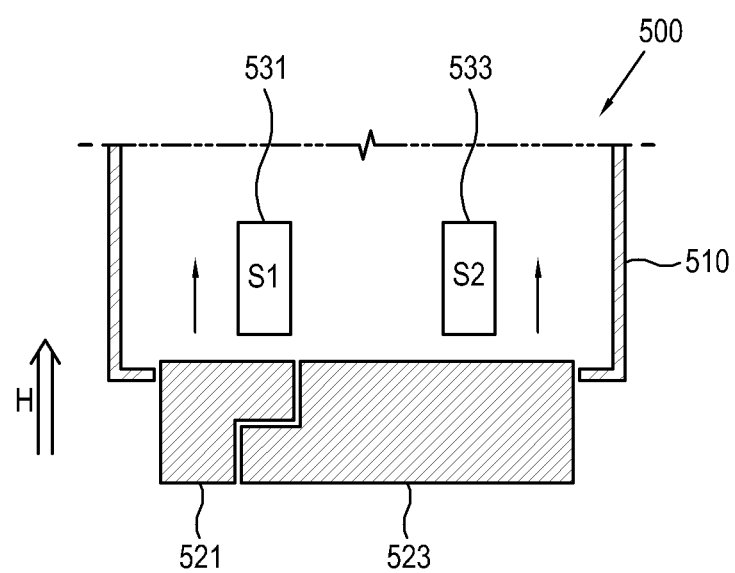
FIG. 14 illustrates a structure of a tip of an erasing device according to a second exemplary embodiment.

FIG. 14 illustrates structures of tips 521 and 523 of the erasing device 500 according to the second embodiment.

As shown in FIG. 14, the erasing device 500 includes a housing 510, a first tip 521 and a second tip 523 disposed in an end portion of the housing 510, and a first sensor 531 and a second sensor 533 to detect touches on the first tip 521 and the second tip 523, respectively. Other components are substantially the same as those mentioned in the first embodiment, and thus descriptions thereof are omitted herein.

The first tip 521 and the second tip 523 are detected by the first sensor 531 and the second sensor 533 in the housing 510, respectively, when pressed in an inward direction of the housing 519, that is, an H direction. That is, when the first tip 521 and the second tip 523 touch the display 130, the first tip 521 and the second tip 523 move inside the housing 510 by a predetermined distance, and the first sensor 531 and the second sensor 533 detect movements of the first tip 521 and the second tip 523, respectively.

Here, the second tip 523 has a larger touched area than the first tip 521. Further, the second tip 523 presses the first tip 521 when moving in the H direction, whereas the first tip 521 does not press the second tip 523 when moving in the H direction. The first tip 521 moves alone in the H direction when only the first tip 521 touches the display 130, and thus the first sensor 531 outputs a detection signal while the second sensor 533 does not output a detection signal.

However, when the second tip 523 touches the display 130, not only the second tip 523 moves in the H direction but the first tip 521 also moves in the H direction by being pressed by the second tip 523, and accordingly both the first sensor 531 and the second sensor 533 output detection signals.

Thus, even though the first tip 521 does not touch the display 130 while the user is performing an erasing operation with the erasing device 500 standing upright, an image deletion region is not reduced during the operation.

Hereinafter, a third exemplary embodiment will be described.

Figure 15:
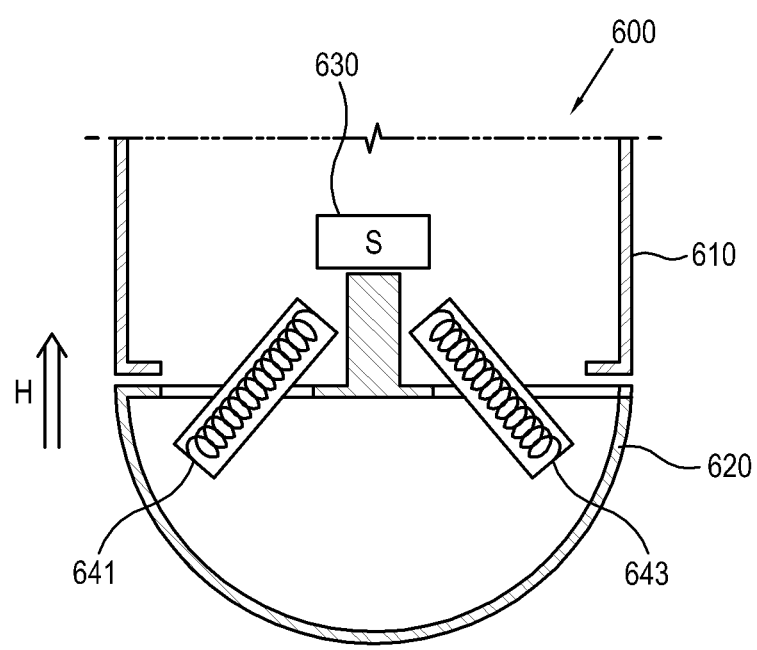
FIG. 15 illustrates a structure of a tip of an erasing device according to a third exemplary embodiment.

FIG. 15 illustrates a structure of a tip 620 of an erasing device 600 according to the third embodiment.

As shown in FIG. 15, the erasing device 600 includes a housing 610, the tip 620 on an end portion of the housing 610, a sensor 630 to detect a touch on the tip 620, and a first resonance coil 641 and a second resonance coil 643 disposed in the housing 610 and the tip 620. Other components are substantially the same as those mentioned in the first embodiment, and thus descriptions thereof are omitted herein.

Unlike in the foregoing embodiments, the tip 620 is not divided into a plurality of regions. The sensor 630 detects a movement of the tip 620 and outputs a detection signal regardless of an angle formed between the erasing device 600 and the display 130 when the tip 620 moves in an H direction by touching the display 130.

As the erasing device 600 according to the present embodiment includes only one sensor 630, both the first resonance coil 641 and the second resonance coil 643 generate an electromagnetic field when a detection signal is output from the sensor 630.

The first resonance coil 641 and the second resonance coil 643 may be disposed to extend parallel with each other in the same manner as in the foregoing embodiments. Alternatively, as shown in FIG. 15, the first resonance coil 641 and the second resonance coil 643 may be disposed at an angle with respect to a longitudinal axis of the erasing device 600 so that an end portion of the first resonance coil 641 and an end portion of the second resonance coil 643 which emit electromagnetic fields are more spaced than the other portions.

Hereinafter, ways in which the user uses the erasing device 600 will be described with reference to FIGS. 16 and 17.

Figure 16:
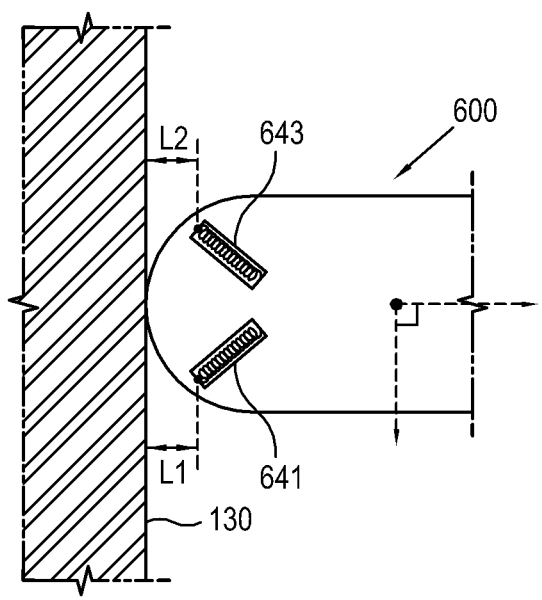
FIG. 16 illustrates that a user uses the erasing device of FIG. 15 standing upright.

FIG. 16 illustrates that the user uses the erasing device 600 standing upright.

Referring to FIG. 16, the user uses the erasing device 600 standing substantially perpendicular to the touched surface of the display 130.

A distance L1 from the touched surface of the display 130 to the first resonance coil 641 is the same as a distance L2 from the touched surface of the display 130 to the second resonance coil 643. In this case, both the electromagnetic field from the first resonance coil 641 and the electromagnetic field from the second resonance coil 643 are exerted on the digitizer module 140.

Figure 17:
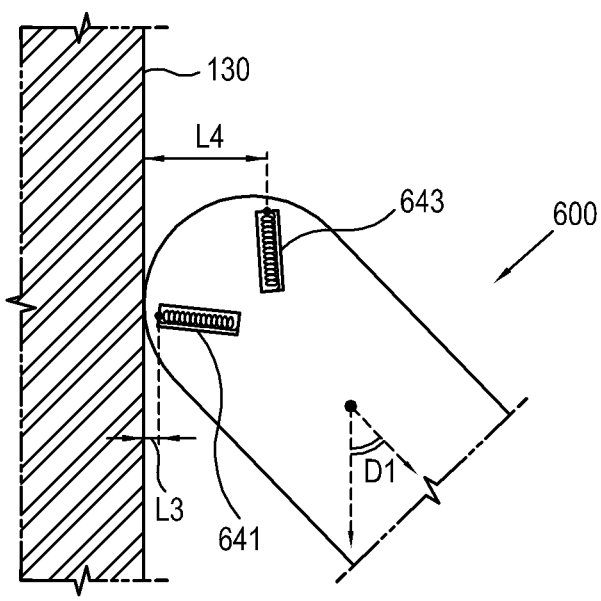
FIG. 17 illustrates that a user uses the erasing device of FIG. 15 at an angle.

FIG. 17 illustrates that the user uses the erasing device 600 at an angle.

Referring to FIG. 17, the user uses the erasing device 600 at an angle to the touched surface of the display 130, that is, the erasing device 300 forms a predetermined angle D1 between 0 degrees and 90 degrees with the touched surface of the display 130.

A distance L3 from the touched surface of the display 130 to the first resonance coil 641 is reduced from the distance L1 shown in FIG. 16. In this case, the electromagnetic field from the first resonance coil 641 is exerted on the digitizer module 140.

However, a distance L4 from the touched surface of the display 130 to the second resonance coil 643 is increased from the distance L2 shown in FIG. 16. In this case, the second resonance coil 643 is out of an effective range of the second resonance coil 643 acting on the digitizer module 140, and thus the electromagnetic field from the second resonance coil 643 is not exerted on the digitizer module 140.

That is, even though both the first resonance coil 641 and the second resonance coil 643 generate electromagnetic fields, the electromagnetic fields may be exerted or may not be exerted on the digitizer module 140 depending on a position of the erasing device 600. As such, the idea of the present invention may be also applied to the erasing device 600 having only one sensor 630, unlike those in the foregoing embodiments.

Referring back to FIGS. 4 and 6, the resonance circuit 350 of the erasing device 300 drives the first resonance coil 341 and the second resonance coil 343 on the same resonance frequency. When an electromagnetic field with a preset resonance frequency is continuously detected by the digitizer module 140, the digitizer module 140 transmits data resulting from detection at a preset unit interval, for example, at an interval of 10 msec, to the controller 150.

Here, the controller 150 may need to determine whether $n^{th}$ data and $(n+1)^{th}$ data transmitted in a next unit interval are due to the same resonance coil, such as the first resonance coil 341, or due to different resonance coils, such as the first resonance coil 341 and the second resonance coil 343, respectively, among data continuously transmitted from the digitizer module 140.

Hereinafter, a method of such determination will be described with reference to FIG. 18.

Figure 18:
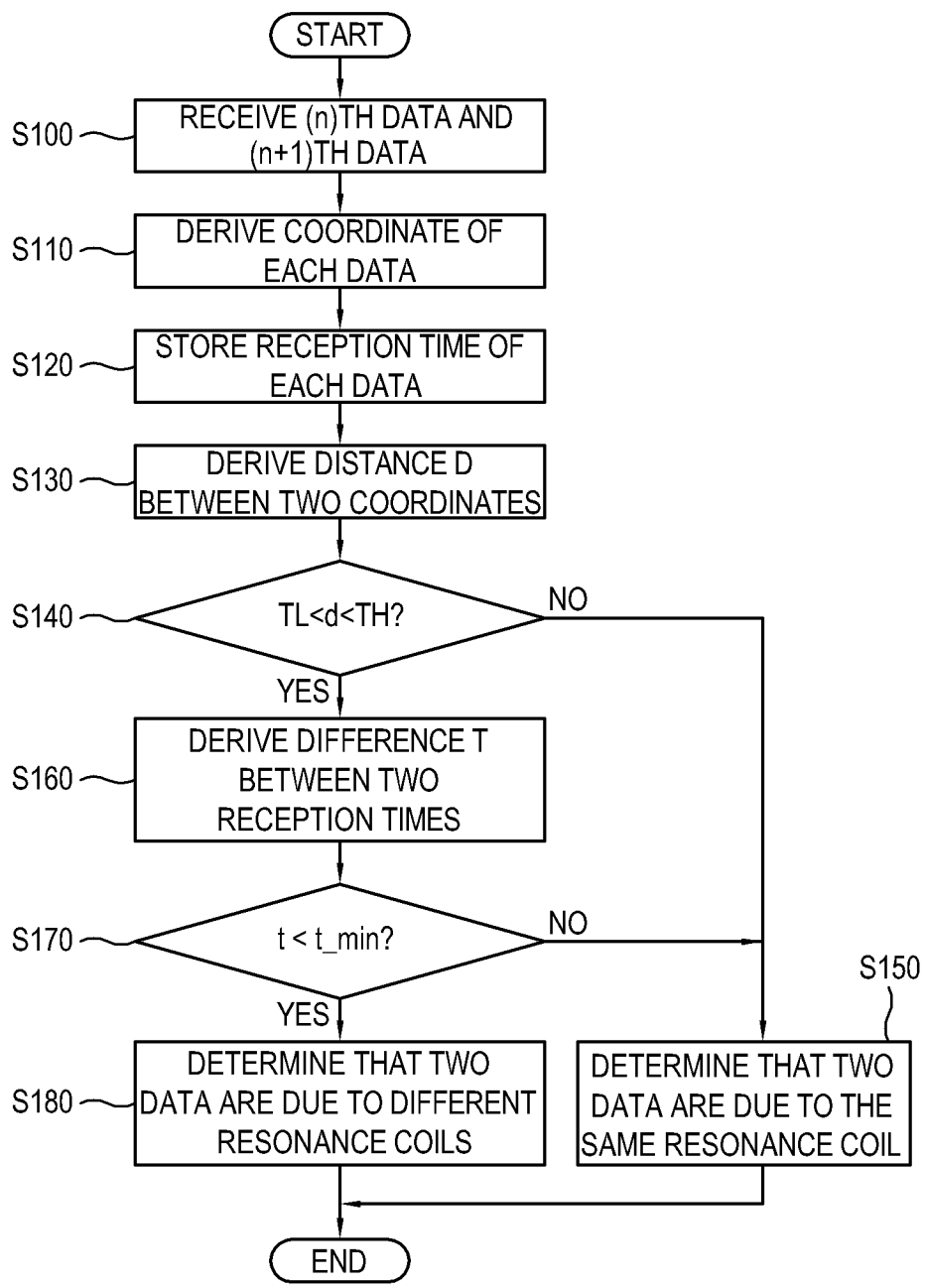
FIG. 18 is a flowchart illustrating a method of determining by a controller of the display apparatus whether nth data and $(n+1)^{th}$ data are due to the same resonance coil or due to different resonance coils according to a fourth exemplary embodiment.

FIG. 18 is a flowchart illustrating a method of determining by the controller 150 of the display apparatus 100 whether $n^{th}$ data and $(n+1)^{th}$ data are due to the same resonance coil or due to the different resonance coils, according to a fourth exemplary embodiment. The present embodiment will be described with reference to the erasing device 300 and the display 100 according to the first embodiment.

As shown in FIG. 18, the controller 150 successively receives the $n^{th}$ data and the $(n+1)^{th}$ data from the digitizer module 140 in operation S100. In operation S100, the controller 150 derives coordinates of the $n^{th}$ data and the $(n+1)^{th}$ data. The controller 150 stores reception time of each data in operation S120.

The controller 150 derives a distance d between the coordinates of the $n^{th}$ data and the $(n+1)^{th}$ data in operation S130. The controller 150 determines whether the distance d is a value between preset thresholds TL and TH, that is, TL<d<TH, in operation S140.

A threshold TL is a minimum distance between coordinates respectively generated by different resonance coils. That is, the threshold TL is a distance between positions of different resonance coils, such as the distance between the first resonance coil 341 and the second resonance coil 343 when the erasing device 300 stands perpendicular to the touched surface of the display 130. Meanwhile, a threshold TH is a maximum distance between the coordinates respectively generated by the different resonance coils, that is, a maximum distance between the positions of the different resonance coils. Here, the thresholds TL and TH may be changed variously in designing the erasing device 300 and thus are not limited to specific values.

When the distance d is not between the thresholds TL and TH, the controller 150 determines that the $n^{th}$ data and the $(n+1)^{th}$ data are due to the same resonance coil in operation S150.

However, when the distance d is between the thresholds TL and TH, the controller 150 derives a time difference t between reception times of the $n^{th}$ data and the $(n+1)^{th}$ data in operation S160. The controller 150 determines whether the time difference t is smaller than preset t_min, that is, t<t_min, in operation S170. t_min is a minimum time taken for a person to physically move between the coordinates of the $n^{th}$ data and the $(n+1)^{th}$ data. That is, t<t_min does not ensure that a person physically moves between the two coordinates. t>t_min ensures that a person physically moves between the two coordinates.

When t<t_min, the controller 150 determines that the $n^{th}$ data and the $(n+1)^{th}$ data are due to the different resonance coils, in operation S180. When t is not smaller than t_min, the controller 150 determines that the $n^{th}$ data and the $(n+1)^{th}$ data are due to the same resonance coil in operation S150.

In this way, the controller 150 of the display apparatus 100 may determine whether the $n^{th}$ data and the $(n+1)^{th}$ data received from the digitizer module 140 are due to the same resonance coil or due to the different resonance coils, respectively.

The aforementioned embodiment illustrates that the two resonance coils of the erasing device are driven on the same resonance frequency. However, the two resonance coils of the erasing device may have different driving frequencies.

Figure 19:
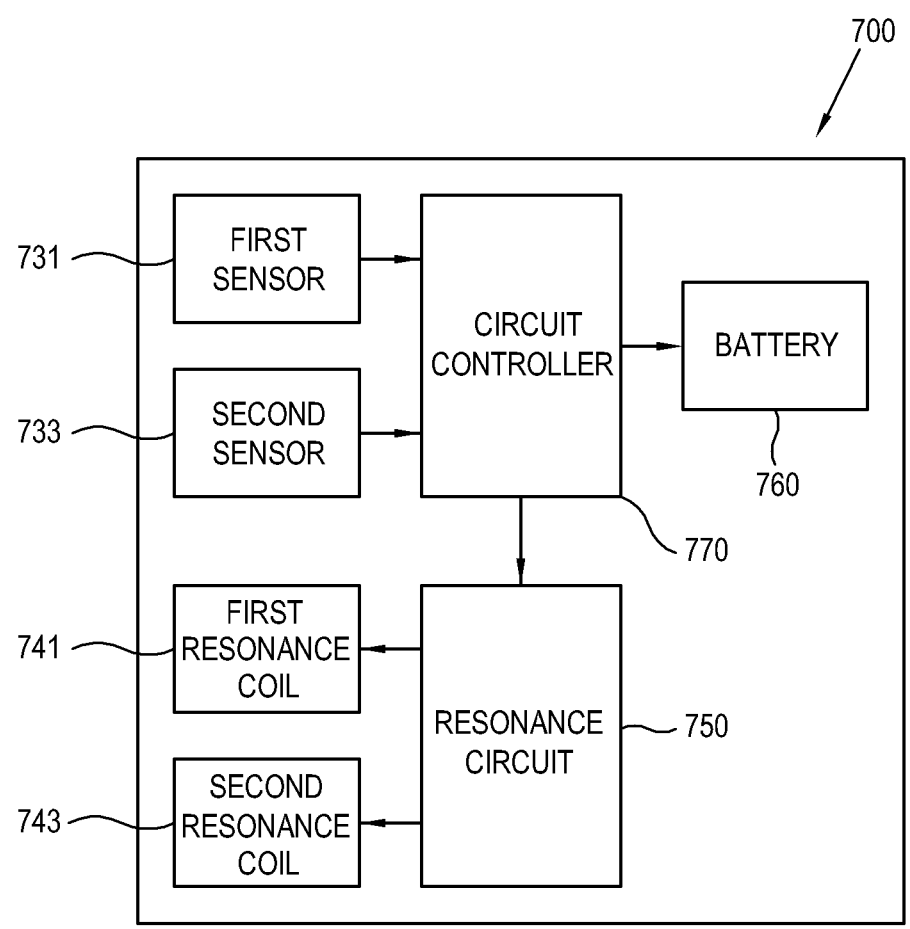
FIG. 19 is a block diagram illustrating a configuration of an erasing device according to a fifth exemplary embodiment.

FIG. 19 is a block diagram illustrating a configuration of an erasing device 700 according to a fifth exemplary embodiment.

As shown in FIG. 19, the erasing device 700 according to the present embodiment includes a first sensor 731, a second sensor 733, a first resonance coil 741, a second resonance coil 743, a resonance circuit 750, a battery 760 and a circuit controller 770. These components serve substantially the same functions as those in the foregoing embodiments, and thus descriptions thereof are omitted herein.

Here, the resonance circuit 750 drives the first resonance coil 741 and the second resonance coil 743 on different resonance frequencies, respectively. Thus, when an electromagnetic field by either of the first resonance coil 741 and the second resonance coil 743 is detected, the display apparatus 100 may determine whether the detected electromagnetic field is due to the first resonance coil 741 or due to the second resonance coil 743.

Accordingly, the display apparatus 100 may set the image deletion region to have different corresponding areas when only an electromagnetic field from the first resonance coil 741 is detected, when only an electromagnetic field from the second resonance coil 743 is detected, and when the electromagnetic fields from both the first resonance coil 741 and the second resonance coil 743 are detected.

Defining the area of the image deletion region when only the electromagnetic field from the first resonance coil 741 is detected as a1, the area of the image deletion region when only the electromagnetic field from the second resonance coil 743 is detected as a2, and the area of the image deletion region when the electromagnetic fields from both the first resonance coils 741 and the second resonance coil 743 are detected as a3, the display apparatus 100 may set a1<a2<a3.

Meanwhile, the foregoing embodiment illustrates that the erasing device includes the two resonance coils. However, the erasing device may include three or more resonance coils.

Hereinafter, an erasing device including three resonance coils according to an exemplary embodiment will be described.

Figure 20:
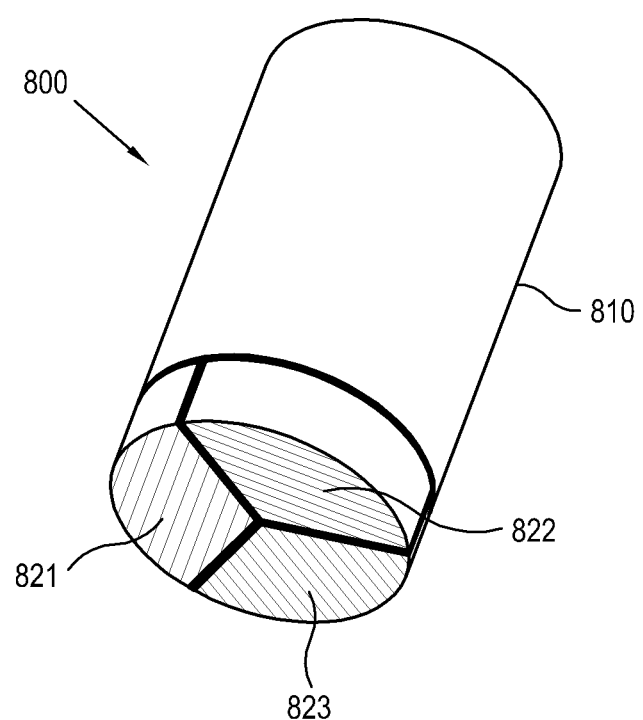
FIG. 20 is a perspective view of an erasing device according to a sixth exemplary embodiment.

FIG. 20 is a perspective view of an erasing device 800 according to a sixth exemplary embodiment.

As shown in FIG. 20, the erasing device 800 includes a housing 810 in a cylindrical shape and a first tip 821, a second tip 822 and a third tip 823 on an end portion of the housing 810.

The first tip 821, the second tip 822 and the third tip 823 are disposed to be at the same height, that is, parallel with each other, when the erasing device 800 stands perpendicular to the touched surface of the display 130. That is, all of the first tip 821, the second tip 822 and the third tip 823 touch the touched surface of the display 130 when the user places the erasing device 800 to perpendicularly touch the surface the display 130.

Further, when the user places the erasing device 800 to touch the touched surface of the display 130 at an angle which is not 90 degrees, only one or two of the first tip 821, the second tip 822 and the third tip 833 touch the touched surface of the display 130 depending on a position of the erasing device 800.

Figure 21:
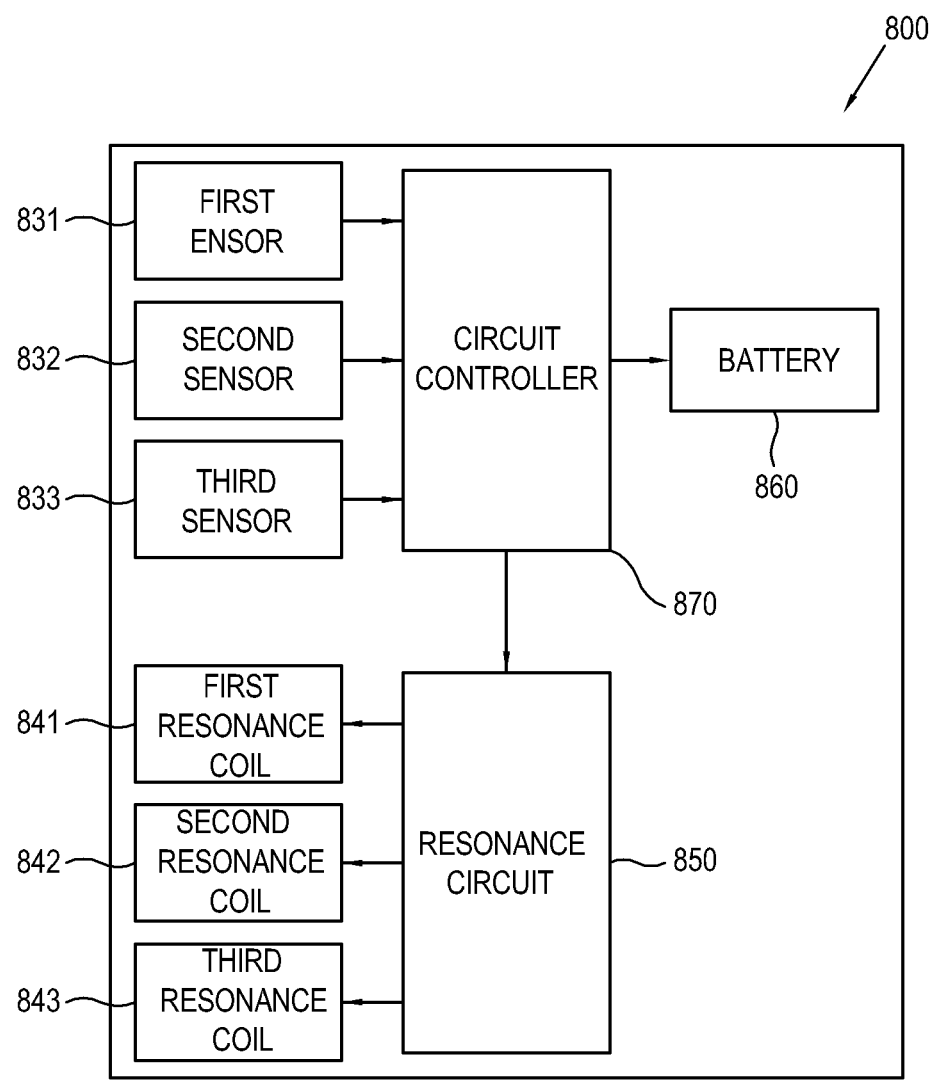
FIG. 21 is a block diagram illustrating a configuration of the erasing device of FIG. 20.

FIG. 21 is a block diagram illustrating a configuration of the erasing device 800.

As shown in FIG. 21, the erasing device 800 includes a first sensor 831, a second sensor 832, a third sensor 833, a first resonance coil 841, a second resonance coil 842, a third resonance coil 843, a resonance circuit 850, a battery 860 and a circuit controller 870.

The first sensor 831 detects whether the first tip 821 is touched, the second sensor 832 detects whether the second tip 822 is touched, and the third sensor 833 detects whether the third tip 823 is touched.

Further, the first resonance coil 841 is provided corresponding to the first tip 821, the second resonance coil 842 to the second tip 822, and the third resonance coil 843 to the third tip 823.

When it is detected that only the first tip 821 is touched, the circuit controller 870 controls the resonance circuit 850 to drive the first resonance coil 841 only. When it is detected that the first tip 821 and the second tip 822 are touched, the circuit controller 870 controls the resonance circuit 850 to drive the first resonance coil 841 and the second resonance coil 842. Also, when it is detected that all of the first tip 821, the second tip 822 and the third tip 823 are touched, the circuit controller 870 controls the resonance circuit 850 to drive the first resonance coil 841, the second resonance coil 842 and the third resonance coil 843.

The display apparatus 100 detecting an electromagnetic field from the erasing device 800 may adjust the area of the image deletion region corresponding to the foregoing combinations, which is substantially the same as mentioned above in the aforementioned embodiments and thus is not described in detail.

The first resonance coil 841, the second resonance coil 842 and the third resonance coil 843 may have the same resonance frequency or different resonance frequencies, respectively, depending on a design.

As described above, the erasing devices according to the exemplary embodiments include a generator to generate an electromagnetic field so that electromagnetic fields are emitted from a plurality of portions of a tip of the housing and a controller to control the generator to generate the electromagnetic field when the tip touches a touched surface of the display apparatus so that the display apparatus detecting the electromagnetic field erases an image within a preset image deletion region with a predetermined area based on a position on the touched surface touched by the tip.

Here, the generator is provided to adjust output of the electromagnetic field from each portion of the tip based on whether each portion of the tip touches the touched surface so that the display apparatus adjusts the area of the image deletion region based on a portion of the tip touched by the touched surface.

Further, the display apparatus according to the exemplary embodiment includes a display, a digitizing module to detect whether an erasing device touches a position on the display, and a controller to determine the position on the display touched by the erasing device based on a result of detection by the digitizing module and to control to erase an image in an image deletion region with a predetermined area set based on the determined position, the image being displayed on the display.

Here, the controller adjusts at least one of the area and a shape of the image deletion region corresponding to a portion of a tip touching the display among a plurality of portions of the tip of the erasing device to possibly touch the display.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:
1. An electronic apparatus configured to interact with a display apparatus to display an image on the display apparatus, the electronic apparatus comprising:
a housing comprising a tip with a first tip portion and a second tip portion, wherein the first tip portion and the second tip portion are located at a same distal end of the housing;
a sensor configured to detect an inclination of the electronic apparatus with respect to a surface of a display screen of the display apparatus while the first tip portion or the second tip portion touches the surface; and
a controller configured to control a transmission of a signal such that the display apparatus determines a position of the first tip portion or the second tip portion on the display screen based on an interaction between the electronic apparatus and the display apparatus,
wherein the signal corresponds to the detected inclination of the electronic apparatus such that the display apparatus determines a size of a response area based on the inclination of the electronic apparatus and performs an image modification function on the determined response area at the determined position of the image,
wherein the controller is configured to control the transmission of the signal such that the display apparatus reduces the size of the response area in response to detecting one of the first tip portion and the second tip portion touching the surface of the display screen when the electronic apparatus is placed to touch the surface of the display at a preset angle, and
wherein the controller is further configured to control the transmission of the signal such that the display apparatus enlarges the size of the response area in response to detecting both of the first tip portion and the second tip portion touching the surface of the display screen when the electronic apparatus is placed to touch the surface of the display in a direction perpendicular to the surface of the display.

2. The electronic apparatus of claim 1, wherein the controller is configured to control generation of an electromagnetic field that is emitted from the first tip portion or the second tip portion.

3. The electronic apparatus of claim 2, further comprising:
a first resonance coil disposed corresponding to the first tip portion; and
a second resonance coil disposed corresponding to the second tip portion.

4. The electronic apparatus of claim 3, wherein the first resonance coil and the second resonance coil are disposed at a same height when the electronic apparatus is perpendicular to the surface.

5. The electronic apparatus of claim 3, wherein
the sensor is configured to detect that the first tip portion touches the surface and to detect that the second tip portion touches the surface, and
the controller is further configured to drive the first resonance coil when the sensor detects that the first tip portion touches the surface, and to drive the first resonance coil and the second resonance coil when the sensor detects that the first portion and the second portion touch the surface.

6. The electronic apparatus of claim 2, further comprising a third tip portion and a third resonance coil disposed corresponding to the third tip portion.

7. The electronic apparatus of claim 2, further comprising a resonance circuit, a first resonance coil, and a second resonance coil, wherein the resonance circuit is configured to drive the first resonance coil and the second resonance coil at different resonance frequencies.

8. An electronic apparatus configured to interact with a display apparatus to display an image on the display apparatus, the electronic apparatus comprising:
a housing comprising a tip;
a sensor configured to detect an inclination of the electronic apparatus with respect to a surface of a display screen of the display apparatus while the tip touches the surface; and
a controller configured to control a transmission of a signal such that the display apparatus determines a position of the tip on the display screen based on an interaction between the electronic apparatus and the display apparatus,
wherein the signal corresponds to the detected inclination of the electronic apparatus such that the display apparatus determines a size of a response area based on the inclination of the electronic apparatus and performs an image modification function on the determined response area at the determined position of the image,
wherein the sensor is configured to detect that the tip is touched, and
wherein a first resonance coil and a second resonance coil are disposed at an angle with respect to a longitudinal axis of the electronic apparatus such that a gap between the first resonance coil and the second resonance coil becomes wider in a direction away from the longitudinal axis.

9. An electronic apparatus configured to interact with a display apparatus to display an image on the display apparatus, the electronic apparatus comprising:
a housing comprising a tip with a first tip portion and a second tip portion, wherein the first tip portion and the second tip portion are located at a same distal end of the housing;
a sensor configured to detect an inclination of the electronic apparatus with respect to a surface of a display screen of the display apparatus while the first tip portion or the second tip portion touches the surface; and
a controller configured to control a transmission of a signal such that the display apparatus determines a position of the first tip portion or the second tip portion on the display screen based on an interaction between the electronic apparatus and the display apparatus,
wherein the signal corresponds to the detected inclination of the electronic apparatus such that the display apparatus determines a size of a response area based on the inclination of the electronic apparatus and performs an image modification function on the determined response area at the determined position of the image,
wherein the first tip portion and the second tip portion are separate three-dimensional structures, and the first tip portion is configured to be operated independently of the second tip portion,
wherein the first tip portion includes a first protrusion, and the second tip portion includes a second protrusion, and wherein the first and second protrusions are shaped such that depressing the second tip portion will depress the first tip portion, but depressing the first tip portion will not depress the second tip portion.

10. An electronic apparatus configured to interact with a display apparatus to display an image on the display apparatus, the electronic apparatus comprising:

a housing comprising a tip with a first tip portion and a second tip portion, wherein the first tip portion and the second tip portion are located at a same distal end of the housing;

a first resonance coil disposed corresponding to the first tip portion;

a second resonance coil disposed corresponding to the second tip portion;

a first sensor configured to detect contact of the first tip portion with a surface;

a second sensor configured to detect contact of the second tip portion with a surface;

a resonance circuit configured to drive the first resonance coil and the second resonance coil; and a circuit controller configured to control the resonance circuit, and receive output from the first sensor and the second sensor, wherein the circuit controller is further configured to control transmission of a signal dependent upon on an inclination of the electronic apparatus based on output from at least one of the first sensor and the second sensor;

wherein the circuit controller is configured to control the transmission of the signal such that the display apparatus reduces a size of a response area in response to detecting one of the first tip portion and the second tip portion touching the surface of the display apparatus when the electronic apparatus is placed to touch the surface of the display at a preset angle, and the circuit controller is further configured to control the transmission of the signal such that the display apparatus enlarges the size of the response area in response to detecting both of the first tip portion and the second tip portion touching the surface of the display apparatus when the electronic apparatus is placed to touch the surface of the display in a direction perpendicular to the surface of the display, and performs an image modification function on the response area.

11. The electronic apparatus of claim 10, further comprising a third tip portion and a third resonance coil disposed corresponding to the third tip portion.

12. The electronic apparatus of claim 10, wherein the resonance circuit is configured to drive the first resonance coil and the second resonance coil at different resonance frequencies.

* * * * *